United States Patent
Minkin

(10) Patent No.: US 11,145,305 B2
(45) Date of Patent: Oct. 12, 2021

(54) METHODS OF AND ELECTRONIC DEVICES FOR IDENTIFYING AN END-OF-UTTERANCE MOMENT IN A DIGITAL AUDIO SIGNAL

(71) Applicant: YANDEX EUROPE AG, Lucerne (CH)

(72) Inventor: Fedor Aleksandrovich Minkin, Sergiev Posad (RU)

(73) Assignee: YANDEX EUROPE AG, Lucerne (CH)

(*) Notice: Subject to any disclaimer, the term of this patent is extended or adjusted under 35 U.S.C. 154(b) by 175 days.

(21) Appl. No.: 16/539,880

(22) Filed: Aug. 13, 2019

(65) Prior Publication Data
US 2020/0193987 A1 Jun. 18, 2020

(30) Foreign Application Priority Data
Dec. 18, 2018 (RU) .................. 2018144804

(51) Int. Cl.
*G10L 15/22* (2006.01)
*G10L 15/16* (2006.01)
(Continued)

(52) U.S. Cl.
CPC .............. *G10L 15/22* (2013.01); *G10L 15/16* (2013.01); *G10L 15/26* (2013.01); *G10L 25/30* (2013.01);
(Continued)

(58) Field of Classification Search
CPC ......... G10L 15/22; G10L 15/26; G10L 15/16; G10L 25/30; G10L 25/87; G10L 2015/227; G10L 2025/783; G10L 25/78
See application file for complete search history.

(56) References Cited

U.S. PATENT DOCUMENTS 5,617,508 A 4/1997 Reaves
5,692,104 A 11/1997 Chow
(Continued)

FOREIGN PATENT DOCUMENTS

CN 1950882 B 6/2010
CN 108766418 A 11/2018
(Continued)

OTHER PUBLICATIONS

Search Report issued in Russian patent application No. 2018144804 dated Sep. 28, 2020.
(Continued)

*Primary Examiner* — Michael N Opsasnick
(74) *Attorney, Agent, or Firm* — BCF LLP

(57) ABSTRACT

A method and a device for identifying an utterance from a signal is disclosed. the method includes acquiring a set of features for a respective segment of the signal, and an indication of an end-of-utterance moment in time in the signal corresponding to a moment in time after which the utterance has ended. The method includes determining an adjusted end-of-utterance moment in time, and labels for respective sets of features based on the adjusted end-of-utterance moment in time and time intervals of the corresponding segments. A given label is indicative of whether the utterance has ended during the corresponding segment associated with the respective set of features. The method also includes using the sets of features and the respective labels for training a Neural Network to predict during which segment of the digital audio signal the utterance has ended.

20 Claims, 6 Drawing Sheets

(51) Int. Cl.
*G10L 25/30* (2013.01)
*G10L 25/87* (2013.01)
*G10L 15/26* (2006.01)
*G10L 25/78* (2013.01)

(52) U.S. Cl.
CPC ........ *G10L 25/87* (2013.01); *G10L 2015/227* (2013.01); *G10L 2025/783* (2013.01)

(56) References Cited

U.S. PATENT DOCUMENTS

| | | | |
|---|---|---|---|
| 6,064,957 A * | 5/2000 | Brandow | G06F 40/194 704/235 |
| 6,236,970 B1 | 5/2001 | Imai et al. | |
| 6,839,670 B1 | 1/2005 | Buschkuehl et al. | |
| 7,146,318 B2 | 12/2006 | Laurila et al. | |
| 7,366,667 B2 | 4/2008 | Dobler | |
| 8,566,088 B2 | 10/2013 | Pinson et al. | |
| 8,924,209 B2 | 12/2014 | Newman | |
| 9,922,640 B2 | 3/2018 | Rao | |
| 10,134,425 B1 | 11/2018 | Johnson | |
| 2002/0152076 A1 * | 10/2002 | Kahn | G10L 15/063 704/270 |
| 2005/0222843 A1 * | 10/2005 | Kahn | G10L 15/063 704/235 |
| 2009/0138266 A1 | 5/2009 | Nagae | |
| 2013/0262096 A1 * | 10/2013 | Wilhelms-Tricarico | G10L 13/04 704/202 |
| 2015/0205779 A1 * | 7/2015 | Bak | G10L 15/01 704/235 |
| 2015/0348551 A1 | 12/2015 | Bellegarda et al. | |
| 2016/0379632 A1 * | 12/2016 | Hoffmeister | G10L 25/87 704/253 |
| 2017/0069309 A1 | 3/2017 | Aleksic et al. | |
| 2017/0270919 A1 | 9/2017 | Parthasarathi et al. | |
| 2017/0318158 A1 | 11/2017 | Lachapelle et al. | |
| 2018/0090127 A1 | 3/2018 | Hofer et al. | |
| 2019/0362741 A1 * | 11/2019 | Li | G06N 3/08 |

FOREIGN PATENT DOCUMENTS

| | | |
|---|---|---|
| KR | 20010093334 A | 10/2001 |
| RU | 2393549 C2 | 6/2010 |
| RU | 2507609 C2 | 2/2014 |
| WO | 9317415 A1 | 9/1993 |
| WO | 9422131 A2 | 9/1994 |
| WO | 2012025579 A1 | 3/2012 |

OTHER PUBLICATIONS

European Search Report dated May 19, 2020 issued in respect of the related European Patent Application No. 19217744.2.

European Office Action dated Aug. 11, 2020 issued in respect of the related European Patent Application No. 19217744.2.

English machine translation of the Chinese Patent Application CN108766418A (Nov. 6, 2018 Li et al.).

* cited by examiner

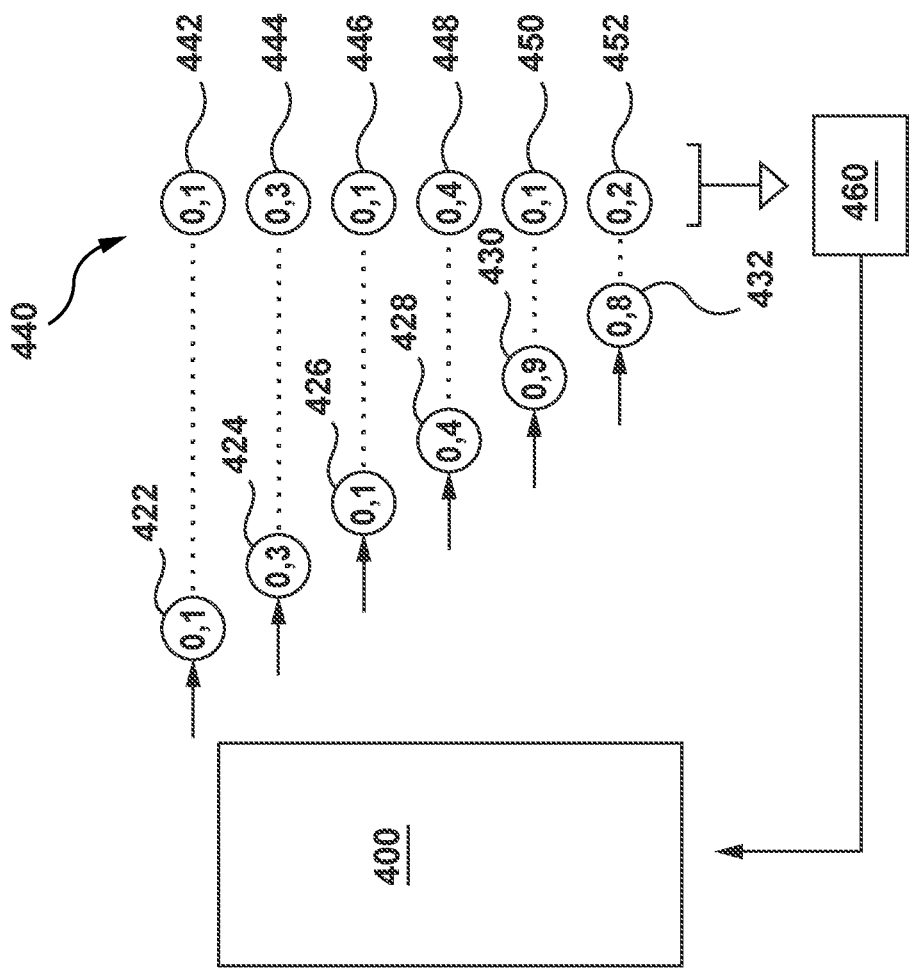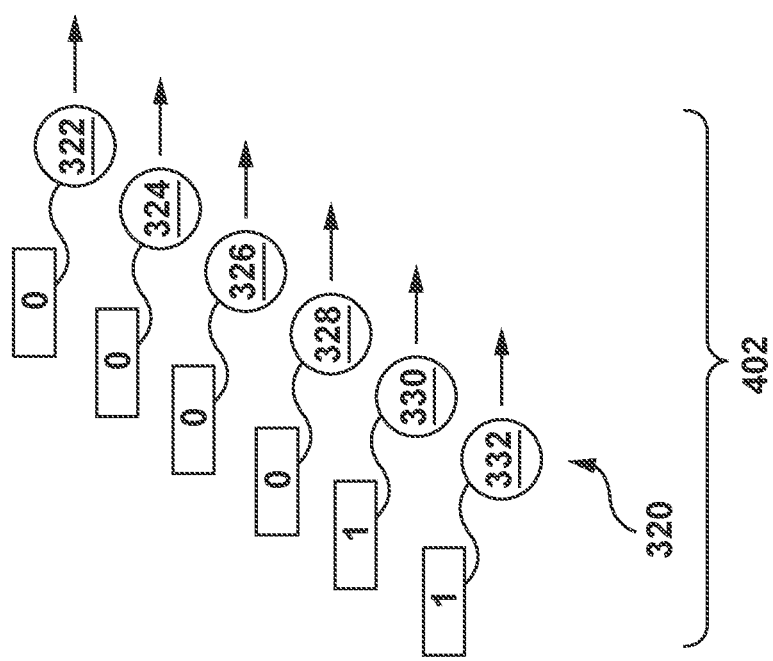
FIG. 4

METHODS OF AND ELECTRONIC DEVICES FOR IDENTIFYING AN END-OF-UTTERANCE MOMENT IN A DIGITAL AUDIO SIGNAL

CROSS-REFERENCE

The present application claims priority to Russian Patent Application No. 2018144804, entitled "Methods of and Electronic Devices for Identifying a User Utterance from a Digital Audio Signal", filed Dec. 18, 2018, the entirety of which is incorporated herein by reference.

FIELD

The present technology relates to intelligent personal assistant systems and, more particularly, to methods and electronic devices for identifying a user utterance from a digital audio signal.

BACKGROUND

Electronic devices, such as smartphones and tablets, are able to access an increasing and diverse number of applications and services for processing and/or accessing different types of information.

However, novice users and/or impaired users and/or users operating a vehicle may not be able to effectively interface with such devices mainly due to the variety of functions provided by these devices or the inability to use the machine-user interfaces provided by such devices (such as a keyboard). For example, a user who is driving or a user who is visually-impaired may not be able to use the touch screen keyboard associated with some of these devices. In addition to the above situations where the user is not able to effectively interact with a device via touch-based interfaces, a plethora of "hands-free" devices are appearing on the market which are controllable via voice-based commands.

Intelligent Personal Assistant (IPA) systems are implemented on some devices and have been developed to perform tasks in response to user voice-based commands. For example, IPA systems may be used for information retrieval and/or navigation purposes. A conventional IPA system, such as Siri® IPA system for example, can receive a digital audio signal containing a user utterance and perform a large variety of tasks in response thereto. For example, an IPA system may be configured to analyze the digital audio signal for recognizing user speech that can be indicative of a voice-based command uttered by the user.

Conventional IPA systems are mainly focused on extracting textual data (speech recognition) from the digital audio signal for performing tasks. For example, the IPA system may determine that the user utterance in the digital audio signal is a voice-based command for providing the user with the current weather, for providing the user with the location of the nearest shopping mall, for launching an application on the device and the like.

However, conventional IPA systems can take a significant amount of time before performing the task in response to a user's voice-based command. User satisfaction with an IPA system can change depending on how "responsive" the IPA system is—that is, users may prefer IPA systems that respond quicker to their voice-based commands.

SUMMARY

Developers of the present technology have appreciated certain technical drawbacks associated with the existing IPA systems. IPA systems are typically configured to capture audio until a pre-determined period of time has passed after the user has stopped uttering. For example, IPA systems may capture 1 second of audio after the user has stopped uttering in order to make sure that the user has completed uttering his command. However, this results in a significant delay and, therefore, the logical information responsive to the user command will also be delayed for provision to the user.

In a first broad aspect of the present technology, there is provided a method of identifying a user utterance from a digital audio signal. The digital audio signal contains an audio recording of the user utterance. The method is executable by an electronic device. The method comprises acquiring, by the electronic device, a set of features for a respective segment of the digital audio signal. Each set of features comprises at least acoustic-type features derivable from a respective segment of the digital audio signal. The segments of the digital audio signal are associated with respective time intervals of a pre-determined time length. The method comprises acquiring, by the electronic device, an indication of an end-of-utterance moment in time in the digital audio signal corresponding to a given moment in time after which the user utterance has ended. The method comprises determining, by the electronic device, an adjusted end-of-utterance moment in time by adding a pre-determined temporal offset to the end-of-utterance moment in time. The method comprises determining, by the electronic device, labels for respective sets of features based on the adjusted end-of-utterance moment in time and the time intervals of the corresponding segments of the digital audio signal. A given label is indicative of whether the user utterance has ended during the corresponding segment of the digital audio signal associated with the respective set of features. The method comprises using, by the electronic device, the sets of features and the respective labels for training a Neural Network (NN) to predict during which segment of the digital audio signal the user utterance has ended.

In some embodiments of the method, a given set of features further comprises linguistic-type features for a respective segment of the digital audio signal.

In some embodiments of the method, the linguistic-type features are determined based on a textual representation of the user utterance. The textual representation comprises at least one word and at least one pause.

In some embodiments of the method, the indication of the end-of-utterance moment in time is determined by at least one of a human-assessor and an Automatic Speech-to-text Alignment (ASA) algorithm.

In some embodiments of the method, using the sets of features and the respective labels for training the NN comprises organizing the sets of features and the respective labels in a same order as the order in which the corresponding segments occur in the digital audio signal.

In some embodiments of the method, the method further comprises, during an in-use phase of the NN, acquiring, by the electronic device, at least some of an in-use digital audio signal. The method further comprises determining, by the electronic device, a first set of features for a first segment of the in-use digital audio signal. The first segment includes a most recently acquired portion of the in-use digital audio signal. The in-use digital audio signal is recorded in real-time during an in-use utterance. The first set of features comprises at least acoustic-type features derivable from the first segment of the digital audio signal. The method further comprises using, by the electronic device, the NN to determine based on the first set of features a first value indicative of a probability of the in-use user utterance having ended during the first segment of the in-use digital audio signal. Responsive to the first value being above the pre-determined threshold, the method further comprises determining, by the electronic device, that the in-use user utterance ended during the first segment of the in-use digital audio signal.

In some embodiments of the method, the method further comprises generating, by the electronic device, a trigger for stopping recording the in-use digital audio signal.

In some embodiments of the method, the method further comprises providing, by the electronic device, an Automatic Speech Recognition (ASR) algorithm with at least some of the in-use digital audio signal for determining a textual representation of the in-use utterance, and generating, by the electronic device, a trigger for stopping providing the ASR algorithm with the in-use digital audio signal.

In some embodiments of the method, the method further comprises, responsive to the first value being below the pre-determined threshold, determining, by the electronic device, a second set of features for a second segment of the in-use digital audio signal. The second segment is sequential to the first segment in the in-use digital audio signal. The second set of features comprises at least acoustic-type features derivable from the second segment of the digital audio signal. The method further comprises using, by the electronic device, the NN to determine based on the first set of features and the second set of features a second value indicative of a probability of the in-use user utterance having ended during the second segment of the in-use digital audio signal. Responsive to the second value being above the pre-determined threshold, the method further comprises determining, by the electronic device, that the in-use user utterance ended during the second segment of the in-use digital audio signal.

In some embodiments of the method, the electronic device comprises one of a user electronic device, and a server coupled to the user electronic device by a communication network.

In a second broad aspect of the present technology, there is provided an electronic device for identifying a user utterance from a digital audio signal. The digital audio signal contains an audio recording of the user utterance. The electronic device is configured to acquire a set of features for a respective segment of the digital audio signal. Each set of features comprises at least acoustic-type features derivable from a respective segment of the digital audio signal. The segments of the digital audio signal are associated with respective time intervals of a pre-determined time length. The electronic device is configured to acquire an indication of an end-of-utterance moment in time in the digital audio signal corresponding to a given moment in time after which the user utterance has ended. The electronic device is configured to determine an adjusted end-of-utterance moment in time by adding a pre-determined temporal offset to the end-of-utterance moment in time. The electronic device is configured to determine labels for respective sets of features based on the adjusted end-of-utterance moment in time and the time intervals of the corresponding segments of the digital audio signal. A given label is indicative of whether the user utterance has ended during the corresponding segment of the digital audio signal associated with the respective set of features. The electronic device is configured to use the sets of features and the respective labels for training a Neural Network (NN) to predict during which segment of the digital audio signal the user utterance has ended.

In some embodiments of the electronic device, a given set of features further comprises linguistic-type features for a respective segment of the digital audio signal.

In some embodiments of the electronic device, the linguistic-type features are determined based on a textual representation of the user utterance, the textual representation comprising at least one word and at least one pause.

In some embodiments of the electronic device, the indication of the end-of-utterance moment in time is determined by at least one of a human-assessor and an Automatic Speech-to-text Alignment (ASA) algorithm.

In some embodiments of the electronic device, the electronic device configured to use the sets of features and the respective labels for training the NN comprises the electronic device configured to organize the sets of features and the respective labels in a same order as the order in which the corresponding segments occur in the digital audio signal.

In some embodiments of the electronic device, the electronic device is further configured to, during an in-use phase of the NN, acquire at least some of an in-use digital audio signal. The electronic device is further configured to determine a first set of features for a first segment of the in-use digital audio signal. The first segment includes a most recently acquired portion of the in-use digital audio signal. The in-use digital audio signal is recorded in real-time during an in-use utterance. The first set of features comprises at least acoustic-type features derivable from the first segment of the digital audio signal. The electronic device is further configured to use the NN to determine based on the first set of features a first value indicative of a probability of the in-use user utterance having ended during the first segment of the in-use digital audio signal. Responsive to the first value being above the pre-determined threshold, the electronic device is further configured to determine that the in-use user utterance ended during the first segment of the in-use digital audio signal.

In some embodiments of the electronic device, the electronic device is further configured to generate a trigger for stopping recording the in-use digital audio signal.

In some embodiments of the electronic device, the electronic device is further configured to provide an Automatic Speech Recognition (ASR) algorithm with at least some of the in-use digital audio signal for determining a textual representation of the in-use utterance, and generate a trigger for stopping providing the ASR algorithm with the in-use digital audio signal.

In some embodiments of the electronic device, the electronic device is further configured to, responsive to the first value being below the pre-determined threshold, determine a second set of features for a second segment of the in-use digital audio signal. The second segment is sequential to the first segment in the in-use digital audio signal. The second set of features comprises at least acoustic-type features derivable from the second segment of the digital audio signal. The electronic device is further configured to use the NN to determine based on the first set of features and the second set of features a second value indicative of a probability of the in-use user utterance having ended during the second segment of the in-use digital audio signal. The electronic device is further configured to, responsive to the second value being above the pre-determined threshold, determine that the in-use user utterance ended during the second segment of the in-use digital audio signal.

In some embodiments of the electronic device, the electronic device comprises one of a user electronic device, and a server coupled to the user electronic device by a communication network.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 depicts a given training iteration of a Neural Network (NN) implemented by the system of FIG. 1 in non-limiting embodiments of the present technology;

DETAILED DESCRIPTION

Figure 1:
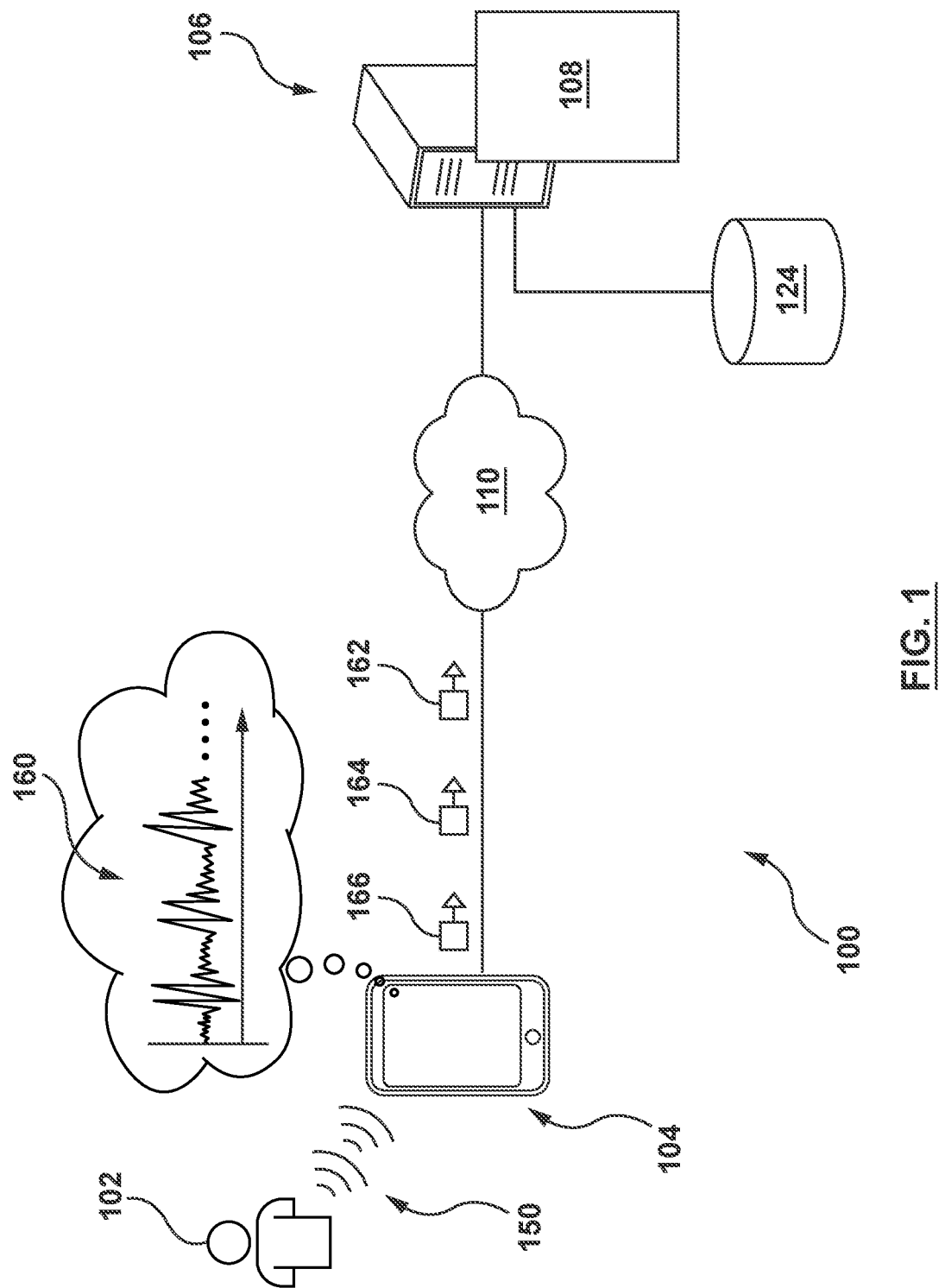
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is not likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 may allow a user 102 to interact with an electronic device 104 via voice-based commands. To that end, the system 100 comprises the electronic device 104 (or simply a "device 104"), a communication network 110 and a server 106.

As illustrated in FIG. 1, the user 102 may be uttering voice-based commands to the device 104. The device 104 is configured to record a digital audio signal 160 while the user 102 is uttering the voice-based command in a form of a user utterance 150. In other words, the device 104 is configured to record the digital audio signal 160 in real-time while the user 102 is uttering the user utterance 150 in proximity to the device 104.

The device 104 is configured to transmit data indicative of portions of the digital audio signal 160 to an IPA processing system 108 as the digital audio signal 160 is being recorded. This means that the device 104 is configured to transmit data indicative of the portions of the digital audio signal 160 to the IPA processing system 108 in real-time while the user 102 is uttering.

Let it be assumed that the portions of the digital audio signal 160 (the data of which is to be transmitted to the IPA processing system 108) are of a time length of 50 ms. In this example, the 50 ms time length may correspond to recording time intervals at which the portions of the digital audio signal 160 are recorded and transmitted to the IPA processing system 108. In this example, for each 50 ms of digital audio signal 160 being recorded, the device 104 may be configured to transmit data to the IPA processing system 108 indicative of that 50 ms of the digital audio signal 160 in real-time.

In other words, in this example, the IPA processing system 108 may receive data indicative of sequential portions of 50 ms of the digital audio signal 160 as the digital audio signal 160 is being recorded. It should be noted that a time length of 50 ms for a given portion of the digital audio signal 160 is provided in the above non-exhaustive example solely for illustration purposes and is not intended to limit the scope of the present technology.

While receiving data indicative of sequential portions of the digital audio signal 160, broadly speaking, the IPA processing system 108 is configured to inter alia determine whether the user utterance 150 has ended during a most recently received portion of the digital audio signal 160.

As such, if the IPA processing system 108 determines that the user utterance 150 has ended during the most recently received portion of the digital audio signal 160, the IPA processing system 108 may determine that additional portions of the digital audio signal 160 may not be required (i) for determining the user voice-based command uttered by the user 102 (as the user utterance 150), and (ii) for performing tasks in response to this voice-based command.

Developers of the present technology have realized that designing the IPA processing system 108, such that it is able to determine when the user utterance 150 ends in the digital audio signal 160, may be beneficial for many reasons. In some instances, this may allow the IPA processing system 108 to determine voice-based commands uttered by the user 102 quicker and to earlier perform tasks in response to these voice-based commands.

As a result, determining when the user utterance 150 ends in the digital audio signal 160, as it will be described herein, may improve the "responsiveness" of the IPA processing system 108—that is, it may reduce the amount of time between (i) a moment in time when the user 102 finishes uttering a voice-based command in a form of the user utterance 150 (i.e., the moment in time when the user utterance 150 ends), and (ii) a moment in time when the task in response to the voice-based command is performed by the IPA processing system 108.

It should be noted that, although the IPA processing system 108 is depicted in FIG. 1 as being implemented by the server 106, in other embodiments of the present technology, one or more (or all) components and/or functionalities of the IPA processing system 108 may be implemented by the device 104 (e.g., the IPA processing system 108 may be implemented locally on the device 104) without departing from the scope of the present technology. Various components of the system 100 and how these components may be configured for determining the end of the user utterance 150 will now be described.

Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like). As such, the device 104 can sometimes be referred to as an "electronic device", "end user device", "client electronic device", "user electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof) in order detect the user utterance 150 and/or to record the digital audio signal 160. Generally speaking, the digital audio signal 160 is an output of an audio recording performed by the device 104 while the user 102 is uttering the user utterance 150. As such, the digital audio signal 160 is representative of soundwaves which are detected, recorded, and converted into a digital form in real-time while the user 102 is uttering.

In some embodiments, the device 104 may also comprise hardware and/or software and/or firmware (or a combination thereof) in order to execute an IPA application. Generally speaking, the purpose of the IPA application, also known as a "chatbot", is to enable the user 102 to interact with the device 104 by means of speech. The IPA application may enable speech-based interaction between the user 102 and the device 104 by employing the IPA processing system 108. Thus, it can be said that the IPA application is associated with the IPA processing system 108.

It should be noted that, in some embodiments of the present technology, the device 104 may also implement components and/or functionalities of the server 106. For example, the device 104 may comprise hardware and/or software and/or firmware (or a combination thereof), as is known in the art, in order to locally implement the IPA processing system 108. In such a case, both the IPA application and the IPA processing system 108 can be implemented locally on the device 104 without departing from the scope of the present technology.

In some embodiments of the present technology, where the IPA processing system 108 is implemented by the server 106, the device 104 may be configured to transmit data indicative of the portions of the digital audio signal 160, as mentioned above, to the server 106.

For example, the device 104 may be configured to generate a first data packet 162 comprising data indicative of a first portion of the digital audio signal 160, and may send (in real-time) the first data packet 162 to the server 106 while a second portion of the digital audio signal 160 is being recorded.

The device 104 may be configured to generate a second data packet 164 comprising data indicative of the second portion of the digital audio signal 160, and may send (in real-time) the second data packet 164 to the server 106 while a third portion of the digital audio signal 160 is being recorded.

The device 104 may be configured to generate a third data packet 166 comprising data indicative of the third portion of the digital audio signal 160, and may send (in real-time) the third data packet 166 to the server 106 while another portion of the digital audio signal 160 is being recorded, and so on.

Therefore, it can be said that, in some embodiments of the present technology, where the IPA processing system 108 is implemented by the server 106, the device 104 may be configured to transmit a stream of data packets to the server 106 and where the data packets comprise data indicative of sequential portions of the digital audio signal 160.

In other embodiments of the present technology, where the IPA processing system 108 is implemented by the device 104, the device 104 may be configured to locally transmit a given stream of data packets to the IPA processing system 108 and where the data packets comprise data indicative of sequential portions of the digital audio signal 160.

Communication Network

In the illustrative example of the system 100, the device 104 is communicatively coupled to the communication network 110 for accessing and transmitting data packets (such as the first data packet 162, the second data packet 164, and the third data packet 166, for example) to/from the server 106. In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

In some embodiments of the present technology, where the IPA processing system 108 is implemented by the device 104, the communication network 110 may be omitted without departing from the scope of the present technology.

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to acquire (in real-time) data indicative of portions of the digital audio signal 160, and use the IPA processing system 108 for performing various tasks for the user 102. However, in addition to using the IPA processing system 108 for performing various tasks for the user 102, the server 106 may be configured to "train" at least some components of the IPA processing system 108.

Components and functionalities of the IPA processing system 108 and how the server 106 is configured to "train" at least some components of the IPA processing system 108 will be described in greater details herein further below.

Database

The server 106 is also communicatively coupled to a database 124. In the depicted illustration, the database 124 is depicted as single physical entity. This does not need to be so in each and every embodiment of the present technology. As such, the database 124 may be implemented as a plurality of separate databases. Optionally, the database 124 may be split into several distributed storages.

The database 124 is configured to store information processed or used by the server 106. Generally speaking, the database 124 may receive data from the server 106 for temporary and/or permanent storage thereof and may provide stored data to the server 106 for processing thereof.

In some embodiments, the database 124 may store data that can be used by the server 106 in order to generate at least some training data for training at least some components of the IPA processing system 108. In other embodiments, the database 124 may store the training data itself that the server 106 may use for training the at least some components of the IPA processing system 108.

Figure 2:
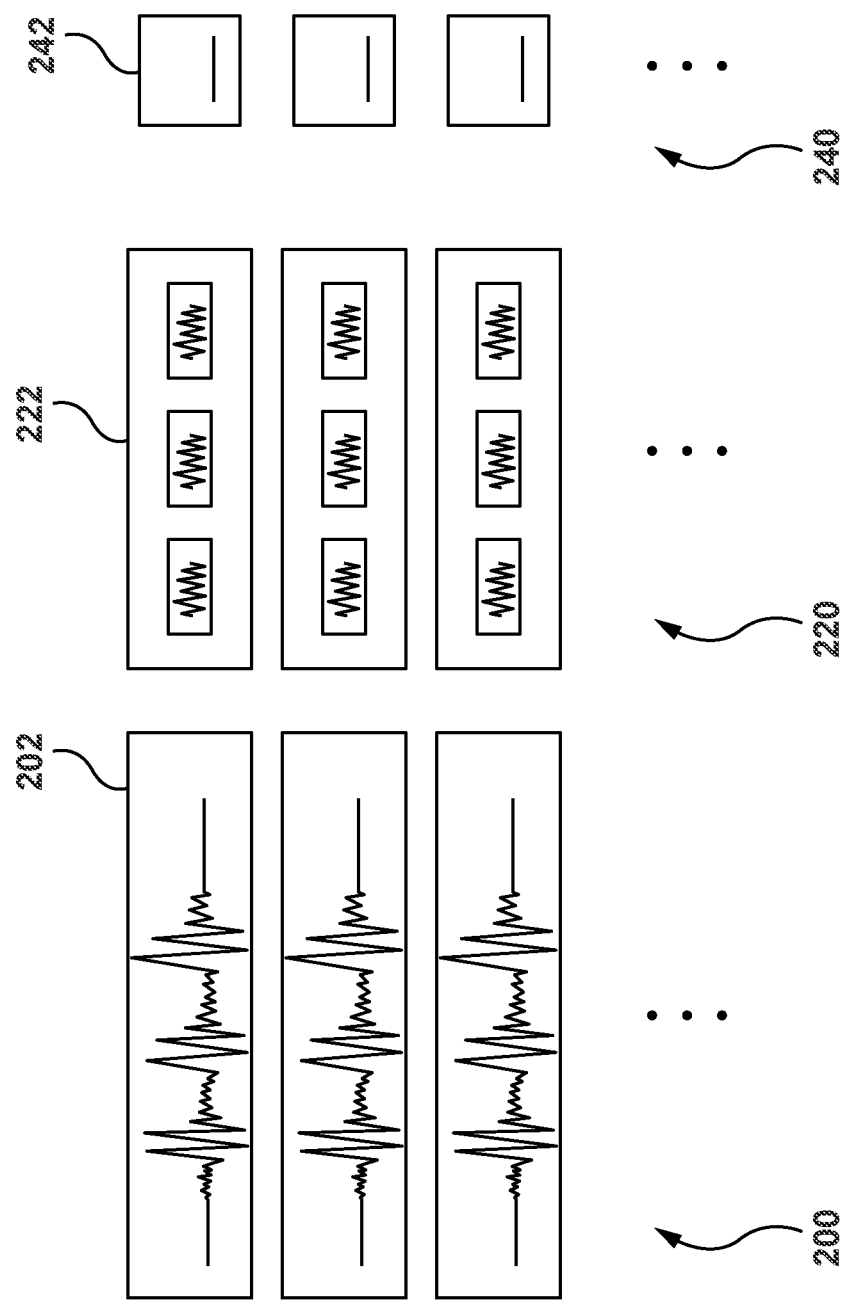
FIG. 2 depicts at least some data that is storable in a database of the system of FIG. 1 in non-limiting embodiments of the present technology.

In one embodiment, the database 124 may store a plurality of digital audio signals. For example, with reference to FIG. 2, there is depicted a plurality of digital audio signals 200 that can be stored in the database 124. The database 124 may store a large number of digital audio signals such as 10000, 100000, 1000000 and the like.

The plurality of digital audio signals 200 may be collected and stored in the database 124 in many different ways. However, just as examples, the plurality of digital audio signals 200 can be recorded by human-assessors and/or crowed-sourced.

In one example, the plurality of digital audio signals 200 may be audio recordings of utterances that are indicative of typical user utterances performed by users while interacting with devices similar to the device 104. In a case where the device 104 is "a smart-speaker-type" of device, typical user utterances may be, but are not limited to: "Turn off", "Play music", "Lower the volume", "What is the current whether", "Where is the nearest gas station", "Sleep mode", "Call Ilya", "Set a reminder for seven am", and so on.

In some embodiments, the database 124 may store textual representations of user utterances associated with the respective ones of the plurality of digital audio signals 200. For example, the database 124 may store a plurality of textual representations 220. In this example, each of the plurality of digital audio signals 200 is associated with a respective one of the plurality of textual representations 220.

Let's take the example of a digital audio signal 202 from the plurality of digital audio signals 200 stored in the database 124. The digital audio signal 202 is associated with a textual representation 222 from the plurality of textual representations 220. The textual representation 222 comprises at least one word and potentially pauses, and is a text-based form of the utterance recorded in the digital audio signal 202. For example, if the digital audio signal 202 is an audio recording of a human uttering "Play music", the textual representation 222 is the text-based form of that utterance.

The plurality of textual representations 220 may be collected and stored in the database 124 in many different ways. However, just as examples, the plurality of textual representations 220 can be generated by the human-assessors and/or crowed-sourced who recorded the digital audio signals 200 and/or generated by speech to text processing of the digital audio signals 200 by a computer-based system.

For example, the digital audio signal 202 may be provided to a given human-assessor that may listen to the digital audio signal 202, comprehend the respective user utterance and reproduce the text-based form of that utterance for generating the textual representation 222. Human-assessors may be requested to perform a similar task for each of the plurality of digital audio signals 200 for generating a respective one of the plurality of textual representations 220. Alternatively, the textual representation 222 may be a source text that was used by the given human-assessor or the crowed-sourced assessor to generate the digital audio signal 202.

In another example, the server 106 may employ an Automatic Speech Recognition (ASR) algorithm for generating the plurality of textual representations 220 based on the plurality of digital audio signals 200. Broadly speaking, ASR algorithms, sometimes referred to as "Speech To Text (STT) algorithms", enable computer-based systems to recognize and translate spoken language into a text-based form.

In this example, the server 106 may input the digital audio signal 202 into the ASR algorithm which is configured to output, in response, the textual representation 222. As such, the server 106 may iteratively input digital audio signals from the plurality of digital audio signals 200 into the ASR algorithm which, in response, may generate the respective ones of the plurality of textual representations 220.

In some embodiments of the present technology, the database 124 may store timestamps in association with digital audio signals. For example, the database 124 may store a plurality of timestamps 240. In this example, each of the plurality of digital audio signals 200 is associated with a respective one of the plurality of timestamps 240.

In the example of the digital audio signal 202, the digital audio signal 202 is associated with a timestamp 242. The timestamp 242 is indicative of a moment in time in the digital audio signal 202 after which the user utterance of the digital audio signal 202 has ended.

In the context of the present technology, this moment in time is an "end-of-utterance" moment in time of the digital audio signal 202. In other words, in the digital audio signal 202, the audio recording of the user utterance ends at the "end-of-utterance" moment in time. In one example, this end-of-utterance moment in time in the digital audio signal 202 may coincide with a moment in time when the user stops uttering. The end-of-utterance moment in time can be said to be a given moment in time in the digital audio signal 202 after which the user utterance has ended.

The plurality of timestamps 240 may be collected and stored in the database 124 in many different ways. Just as examples, the plurality of timestamps 240 can be generated by human-assessors and/or crowed-sourced and/or by a computer-based system.

For example, the digital audio signal 202 may be provided to a given human-assessor that may listen to the digital audio signal 202, and mark a given moment in time of the digital audio signal 202 after which the user utterance recorded in the digital audio signal 202 has ended. Human-assessors may be requested to perform a similar task for each of the plurality of digital audio signals 200 for generating a respective one of the plurality of timestamps 240.

In another example, the server 106 may employ an Automatic Speech-to-text Alignment (ASA) algorithm for generating the plurality of timestamps 240 based on the plurality of digital audio signals 200 and on the plurality of textual representations 220. Broadly speaking, ASA algorithms enable computer systems to generate a time-aligned word index based on (i) a digital audio signal containing an audio recording of human speech (e.g., user utterance), and (ii) a textual representation of that speech. In other words, ASA algorithms are configured to perform an automatic alignment of an audio recording of human speech with its transcription at a word level.

In this example, the server 106 may input the digital audio signal 202 and the textual representation 222 into the ASA algorithm which is configured to automatically "time-align" the words from the textual representation 222 so as to obtain time intervals of the digital audio signal 202 during which the respective words from the textual representation 222 are uttered.

As a result, for each word from the textual representation 222, the ASA algorithm may output two timestamps: (i) a first one being indicative of a moment in time in the digital audio signal 202 when the utterance of a given word begins, and (ii) a second one being indicative of a moment in time in the digital audio signal 202 when the utterance of the respective word ends. Therefore, the server 106 may determine that the second timestamp associated with the last word of the textual representation 222 is indicative of the end-of-utterance moment in time for the digital audio signal 202.

In summary, the server 106 may iteratively input digital audio signals from the plurality of digital audio signals 200 and the respective textual representations from the plurality of textual representations 220 into the ASA algorithm that may be used to determine the respective timestamps from the plurality of timestamps 240.

The database 124 may also store sets of features in association with a respective one of the plurality of digital audio signals 200. These sets of features may be determined by the server 106. How sets of features for the digital audio signal 202 may be determined by the server 106 will now be described with reference to FIG. 3.

Figure 3:
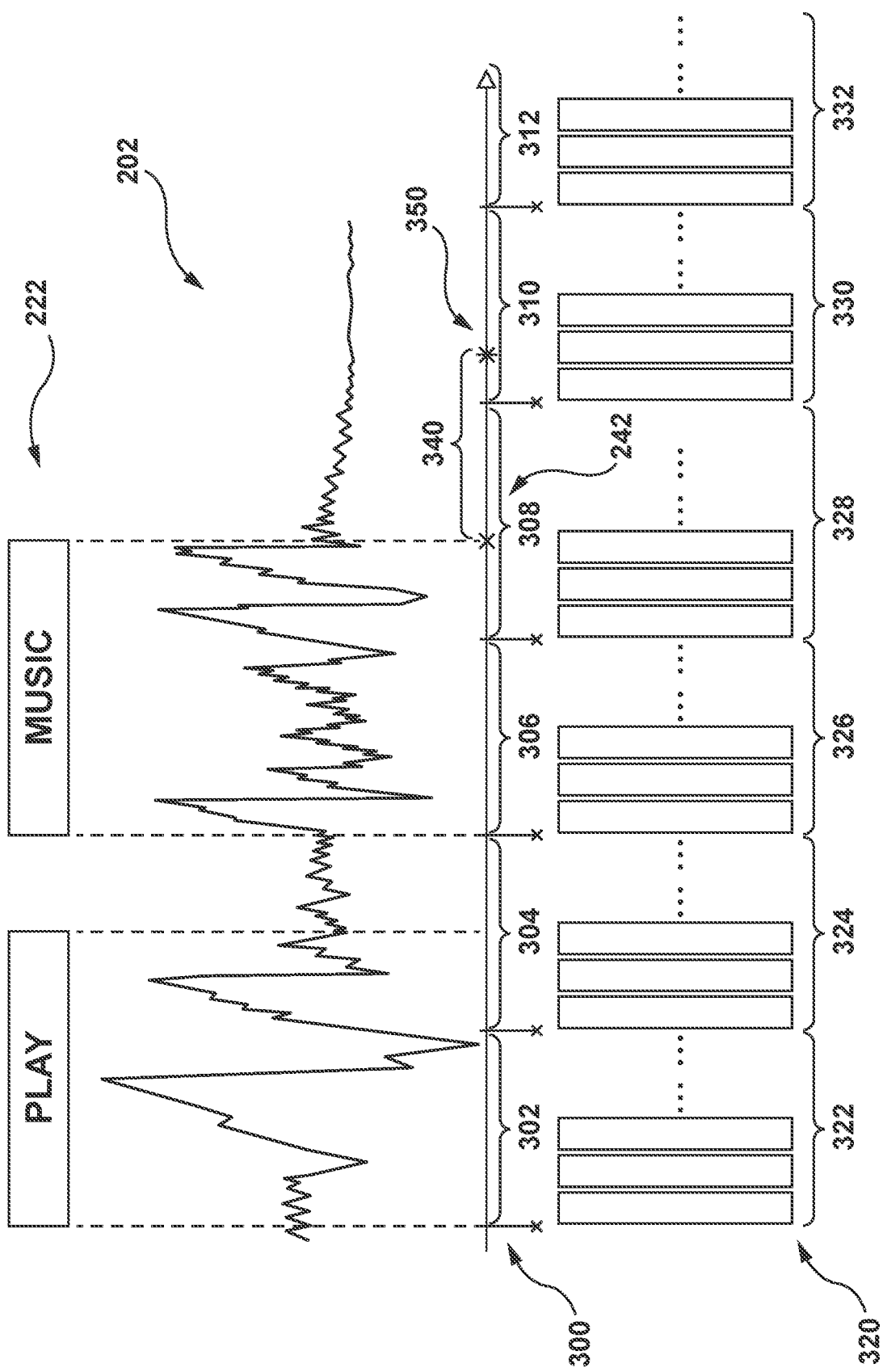
FIG. 3 depicts a digital audio signal and a plurality of sets of features associated therewith in accordance with non-limiting embodiments of the present technology.

In FIG. 3, there is depicted the digital audio signal 202 and the respective textual representation 222. Let it be assumed that the text-based form (e.g., the textual representation 222) of the user utterance recorded as part of the digital audio signal 202 is "'Play' 'music'". There is also depicted the end-of-utterance moment in time corresponding to the timestamp 242 associated with the digital audio signal 202.

In some embodiments, when determining the sets of features for the digital audio signal 202, the server 106 may be configured to segment the digital audio signal 202 into a plurality of segments 300, namely: a first segment 302, a second segment 304, a third segment 306, a fourth segment 308, a fifth segment 310 and a sixth segment 312.

The server 106 may segment the digital audio signal 202 into segments of a pre-determined time length. For example, segments in the plurality of segments 300 may have a time length of 100 ms. However, the pre-determined time length, which is determined by an operator of the server 106, may be different from the above non-exhaustive example in other implementations and without departing from the scope of the present technology.

It is contemplated that the server 106 may be configured to determine a respective set of features for each segment from the plurality of segments 300. In some embodiments, a given set of features may comprise acoustic-type features. In other embodiments, the given set of features may comprise acoustic-type features, as well as linguistic-type features.

To better illustrate this, let's take the example of the first segment 302 from the plurality of segments 300. In some embodiments, in order to determine a given set of features for the first segment 302, the server 106 may be configured to further segment the first segment 302 into a plurality of sub-segments (not depicted). For example, if the first segment 302 has a time length of 100 ms, the server 106 may further segment the first segment 302 into ten sub-segments each having a time length of 10 ms.

It is contemplated that the server 106 may derive/extract, for each sub-segment of the first segment 302, acoustic-type features by employing one or more signal treatment algorithms. The acoustic-type features derived/extracted by the server 106 employing the one or more signal treatment algorithms for a respective sub-segment may be indicative of, but not limited to: volume level, pitch level, energy level, harmonicity (e.g., autocorrelation of pitch), spectral features and the like.

Once the server 106 derives/extracts the acoustic-type features for each sub-segment, the server 106 may group the acoustic-type features of respective sub-segments, thereby determining a first set of features 322 for the first segment 302. It is contemplated that, acoustic-type features for a given sub-segment may be derived not only from the given sub-segment but also from at least a portion of neighboring sub-segments of the given sub-segment.

It is contemplated that acoustic-type features for a given sub-segment may be arranged into a vector form. Therefore, grouping the acoustic-type features of respective sub-segments may include grouping vectors associated with respective sub-segments into a group of vectors (or into a matrix) that corresponds to the first set of features 322.

This first set of features 322 comprises acoustic-type features for the first segment 302.

In additional embodiments of the present technology, in addition to acoustic-type features, the server 106 may derive/extract linguistic-type features for the respective segments of the plurality of segments 300. For example, the server 106 may employ the ASR algorithm mentioned above for deriving/extracting linguistic-type features for the respective segments from the plurality of segments 300.

This means that in some embodiments, in addition to acoustic-type features, the first set of features 322 may further comprise linguistic-type features that may be derived/extracted from the first segment 302 by the server 106 employing the ASR algorithm.

The server 106 may be configured to determine a plurality of sets of features 320 for the plurality of segments 300 similarly to how the server 106 determine the first set of features 322 for the first segment 302. Hence, the server 106 may be configured to generate:

a second set of features 324 for the second segment 304;
a third set of features 326 for the third segment 306;
a fourth set of features 328 for the fourth segment 308;
a fifth set of features 330 for the fifth segment 310; and
a sixth set of features 332 for the sixth segment 312.

It is contemplated that the server 106 may store the plurality of sets of features 320 in association with the respective segments of the plurality of segments 300 of the digital audio signal 202 in the database 124.

It is contemplated that the plurality of sets of features 320 may be used by the server 106 for training at least some components of the IPA processing system 108. How these sets of features may be used for training the at least some components of the IPA processing system 108 will be described in greater details herein further below.

The server 106 may also be configured to determine labels for sets of features from the plurality of sets of features 320. A given label for a given set of features may be indicative of whether during the corresponding segment of the digital audio signal 202 the user utterance of the digital audio signal 202 has ended.

The server 106 may determine these labels based on an adjusted end-of-utterance moment in time corresponding to a timestamp 350 depicted in FIG. 3. The server 106 is configured to determine the adjusted end-of-utterance moment in time based on the end-of-utterance moment in time (corresponding to the timestamp 242 also depicted in FIG. 3).

It is contemplated that the server 106 may determine the adjusted end-of-utterance moment in time by adding a pre-determined temporal offset 340 to the end-of-utterance moment in time. For example, the server 106 may add a temporal offset of 100 ms to the end-of-utterance moment in time in order to determine the adjusted end-of-utterance moment in time.

The reason for the labels (indicative of whether during the corresponding segment of the digital audio signal 202 the user utterance of the digital audio signal 202 has ended) for sets of features being based on the adjusted end-of-utterance moment in time, instead of the end-of-utterance moment in time, will become apparent from the description herein further below.

Nevertheless, once the adjusted end-of-utterance moment in time (corresponding to the timestamp 350) is determined, the server 106 may determine the labels for the respective sets of features from the plurality of sets of features 320.

For example, the server 106 may determine that the label for the first set of features 322 is "0", since the adjusted end-of-utterance moment in time occurs after the corresponding first segment 302. In other words, the label is indicative of that during the first segment 302, the user utterance of the digital audio signal 202 has not ended.

Similarly, the server 106 may determine that the respective labels for the second set of features 324 and for the third set of features 326 are also "0", since the adjusted end-of-utterance moment in time occurs after the second segment 304 and the third segment 306. In other words, the respective labels for the second set of features 324 and the third set of features 326 are indicative of that during the second segment 304 and the third segment 306, the user utterance of the digital audio signal 202 has not ended.

The server 106 may determine that the label for the fourth set of features 328 is "0", since the adjusted end-of-utterance moment in time occurs after the fourth segment 308. It should be noted that, although the end-of-utterance moment in time (corresponding to the timestamp 242) occurs during the fourth segment 308, the server 106 uses the adjusted end-of-utterance moment in time as a reference moment in time for determining whether the user utterance of the digital audio signal 202 has ended during a given segment of the digital audio signal 202. As mentioned above, the reason why the labels are based on the adjusted end-of-utterance moment in time, instead of the end-of-utterance moment in time, will become apparent from the description herein further below.

The server 106 may determine that the label for the fifth set of features 330 is "1", since the adjusted end-of-utterance moment in time occurs during the fifth segment 310. In other words, this label is indicative of that during the fifth segment 310, the user utterance of the digital audio signal 202 has ended.

Similarly, the server 106 may determine that the label for the sixth set of features 332 is also "1", since the adjusted end-of-utterance moment in time occurs before the sixth segment 312. In other words, this label is indicative of that during the sixth segment 312, the user utterance of the digital audio signal 202 has ended.

In summary, the server 106 may be configured to determine the plurality of sets of features 320, as explained above, for the plurality of segments of the digital audio signal 202. The server 106 is also configured to determine respective labels for the plurality of sets of features 320, and where a given label is indicative of whether during a corresponding segment of the digital audio signal 202 the user utterance has ended.

It should be noted that the server 106 may be configured to store the plurality of sets of features 320 in association with the respective labels in the database 124. The server 106 may be configured to determine labels for sets of features of other ones of the plurality of digital audio signals 200 stored in the database 124 similarly to how the server 106 is configured to determine the labels for the plurality of sets of features 320 of the digital audio signal 202.

The server 106 may use pluralities of sets of features and the respective labels in order to train at least some components of the IPA processing system 108. How the server 106 is configured to train the at least some components of the IPA processing system 108 will now be described.

With reference to FIG. 4, the IPA processing system 108 comprises a Neural Network (NN) 400. The NN 400 is at least one component of the IPA processing system 108 that can be trained by the server 106. In other words, the server 106 may be configured to train the NN 400 of the IPA processing system 108.

Neural Network

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. The given NN is thus a kind of a trained "black box", which can be used in a situation when what is in the "box" is unimportant; it is only important that the "box" provide reasonable answers to given inputs.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation, speech recognition, and the like.

It should be understood that NNs can be classified into various classes of NNs. One of these classes comprises recurrent neural networks (RNNs). These particular NNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs can be implemented as Long Short-Term Memory (LSTM) networks, Gated Recurrent Units (GRUs), Bidirectional RNNs (BRNNs) and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies.

In some embodiments of the present technology, it is contemplated that the NN 400 may be implemented as a given LSTM network. It can be said that the NN 400 may be implemented, in some embodiments, with a given network topology that allows having "memories" of events that previously happened.

To summarize, the implementation of the NN 400 by the IPA processing system 108 can be broadly categorized into two phases—a training phase and an in-use phase.

First, the NN 400 is trained in the training phase. During the training phase, a large number of training iterations may be performed by the server 106 on the NN 400. Broadly speaking, during a given training iteration, the NN 400 is inputted with sets of features associated with a common digital audio signal and, in a sense, "learns" which of these sets of features corresponds to a segment of that digital audio signal during which a user utterance in that digital audio signal has ended (using the adjusted end-of-utterance moment in time corresponding to the timestamp 350 depicted in FIG. 3 as a proxy thereof).

Then, during the in-use phase, once the NN 400 knows what data to expect as inputs (e.g., sets of features) and what data to provide as outputs (e.g., predictions for sets of features), the NN 400 is actually run using in-use data. Broadly speaking, during in-use, the NN 400 is inputted with sets of features associated with an in-use digital audio signal (such as the digital audio signal 160, for example) and is used to determine a probability of a respective corresponding segment of the in-use digital audio signal during which the user utterance has ended.

With reference to FIG. 4, how a given training iteration of the NN 400 may be performed by the server 106 will now be described. In FIG. 4, there is depicted a schematic representation of the given training iteration of the NN 400. Let it be assumed that the given training iteration of the NN 400 is performed based on data associated with the digital audio signal 202. However, it should be noted that a large number of training iterations is performed on the NN 400 during the training phase thereof, as mentioned above, using data associated with other ones of the plurality of digital audio signals 200 similarly to how the given training iteration depicted in FIG. 4 is performed.

For the given training iteration of the NN 400, the server 106 may retrieve training data 402 from the database 124. The training data 402 comprises (i) the plurality of sets of features 320 for the digital audio signal 202, and (ii) the respectively associated labels. As mentioned above, in some embodiments of the present technology, the training data 402 may have been pre-determined by the server 106—that is, the server 106 may have determined and stored the training data 402 prior to the training phase of the NN 400.

The server 106 is configured to input the plurality of sets of features 320 into the NN 400 in a same sequence as the sequence in which the corresponding segments from the plurality of segments 300 occur in the digital audio signal 202. In other words, during the given training iteration, the server 106 is configured to input the plurality of sets of features 320 into the NN 400 in the following order: the first set of features 322, the second set of features 324, the third set of features 326, the fourth set of features 328, the fifth set of features 330, and the sixth set of features 332.

When the server 106 inputs the first set of features 322 into the NN 400, the NN 400 is configured to output a first output value 422 indicative of a probability of that, during the first segment 302 of the digital audio signal 202, the user utterance of the digital audio signal 202 has ended. As illustrated in FIG. 4, let it be assumed that the first output value 422 is "0.1" (or 10% for example). It can be said that the NN 400 determines the first output value of "0.1" for the first segment 302 based on the first set of features 322.

The server 106 then inputs the second set of features 324 into the NN 400. The NN 400 is configured to output a second output value 424 indicative of a probability of that, during the second segment 304 of the digital audio signal 202, the user utterance of the digital audio signal 202 has ended. As illustrated in FIG. 4, let it be assumed that the second output value 424 is "0.3".

As previously alluded to, the NN 400 may have a network topology that enables the NN 400 to have "memories" of events that happened earlier. In other words, the NN 400 may be configured to output the second output value of "0.3" based on (i) the second set of features 324, as well as based on a "memory" of the previously inputted set of features being (ii) the first set of features 322. This means that the NN 400 may determine the second output value 424 of "0.3" for the second segment 304 based on both (i) the second set of features 324 and (ii) the first set of features 322.

The server 106 then inputs the third set of features 326 into the NN 400 and the NN 400 outputs a third output value 426 of "0.1". The NN 400 may determine the third output value 426 of "0.1" for the third segment 306 based on (i) the third sets of features 326, (ii) the second set of features 324, and (iii) the first set of features 322.

The server 106 then inputs the fourth set of features 328 into the NN 400 and the NN 400 outputs a fourth output value 428 of "0.4". The NN 400 may determine the fourth output value 428 of "0.4" for the fourth segment 308 based on (i) the fourth set of features 328, (ii) the third sets of features 326, (iii) the second set of features 324, and (iv) the first set of features 322.

The server 106 then inputs the fifth set of features 330 into the NN 400 and the NN 400 outputs a fifth output value 430 of "0.9". The NN 400 may determine the fifth output value 430 of "0.9" for the fifth segment 310 based on (i) the fifth set of features 330, (ii) the fourth set of features 328, (iii) third sets of features 326, (iv) the second set of features 324, and (v) the first set of features 322.

The server 106 then inputs the sixth set of features 332 into the NN 400 and the NN 400 outputs a sixth output value 432 of "0.8". The NN 400 may determine the sixth output value 432 of "0.8" for the sixth segment 312 based on (i) the sixth set of features 332, (ii) the fifth set of features 330, (iii) the fourth set of features 328, (iv) third sets of features 326, (v) the second set of features 324, and (vi) the first set of features 322.

In summary, as explained above, during the given training iteration of the NN 400 depicted in FIG. 4, the NN 400 predicts that:
 there is a probability of "0.1" that the user utterance has ended during the first segment 302 of the digital audio signal 202;
 there is a probability of "0.3" that the user utterance has ended during the second segment 304 of the digital audio signal 202;
 there is a probability of "0.1" that the user utterance has ended during the third segment 306 of the digital audio signal 202;
 there is a probability of "0.4" that the user utterance has ended during the fourth segment 308 of the digital audio signal 202;
 there is a probability of "0.9" that the user utterance has ended during the fifth segment 310 of the digital audio signal 202; and
 there is a probability of "0.8" that the user utterance has ended during the sixth segment 312 of the digital audio signal 202.

Next, during the given training iteration, the server 106 may be configured to perform a comparison analysis between the output values outputted by the NN 400 and the labels associated with the respective sets of features from the plurality of sets of features 320. Based on this comparison, the server 106 may be configured to determine a plurality of individual penalty values 440.

Let's take the example of the comparison analysis for (i) the label for the first set of features 322 and (ii) the first output value 422. On the one hand, the label for the first set of features 322 is indicative of that the user utterance of the digital audio signal 202 has not ended during the first segment 302 associated with the first set of features 322 or, in other words, there is a probability of "0" that the user utterance of the digital audio signal 202 has ended during the first segment 302. On the other hand, the first output value 422 is a prediction made by the NN 400 that is indicative of a probability of "0.1" that the user utterance of the digital audio signal 202 has ended during the first segment 302.

By comparing the label for the first set of features 322 and the first output value 422, the server 106 may determine that the prediction of the NN 400 for the first segment 302 of the digital audio signal 202 does not match the respective label. Hence, the server 106 may be configured to generate a first individual penalty value 442 indicative of a prediction error made by the NN 400 for the first segment 302 of the digital audio signal 202.

For example, in this case, the first individual penalty value 442 may be a difference between a value of the label for the first set of features 322 and the first output value 422—that is, the first individual penalty value 442 may be "0.1".

Now let's take the example of the comparison analysis for (i) the label for the fifth set of features 330 and (ii) the fifth output value 430. On the one hand, the label for the fifth set of features 332 is indicative of that the user utterance of the digital audio signal 202 has ended during the fifth segment 310 associated with the fifth set of features 330 or, in other words, there is a probability of "1" that the user utterance of the digital audio signal 202 has ended during the fifth segment 310. On the other hand, the fifth output value 430 is a prediction made by the NN 400 that is indicative of a probability of "0.9" that the user utterance of the digital audio signal 202 has ended during the fifth segment 310.

By comparing the label for the fifth set of features 330 and the fifth output value 430, the server 106 may determine that the prediction of the NN 400 for the fifth segment 310 of the digital audio signal 202 does not match the respective label. Hence, the server 106 may be configured to generate a fifth individual penalty value 450 indicative of a prediction error made by the NN 400 for the fifth segment 310 of the digital audio signal 202.

For example, in this case, the fifth individual penalty value 450 may be a difference between a value of the label for the fifth set of features 330 and the fifth output value 430—that is, the fifth individual penalty value 450 may be "0.1".

The server 106 may be configured to generate other ones of the plurality of individual penalty values 440 similarly to how the server 106 is configured to generate the first individual penalty value 442 and the fifth individual penalty value 450.

Once the plurality of individual penalty values 440 is generated, the server 106 may be configured to determine a combined penalty value 460 for the given training iteration of the NN 400. The server 106 may determine the combined penalty value 460 by combining the plurality of individual penalty values 440. In one example, the combined penalty value 460 may be a sum of the plurality of individual penalty values 440.

The server 106 is configured to use the combined penalty value 460 for training the NN 400 during the given training iteration. For example, the server 106 may use back-propagation techniques for adjusting the connections amongst the artificial "neurons" of the NN 400 based on the combined penalty value 460.

Hence, the server 106 is configured to condition the NN 400 such that the NN 400 outputs output values in response to sets of features such that differences between the values of the respective labels and the respective output values are minimized. The higher the differences between the values of the respective labels and the respective output values are, the higher the combined penalty value 460 will be and, therefore, the bigger the adjustment of the connections amongst the artificial "neurons" of the NN 400 may be. By the same token, the lower the differences between the values of the respective labels and the respective output values are, the lower the combined penalty value 460 will be and, therefore, the smaller the adjustment of the connections amongst the artificial "neurons" of the NN 400 may be.

In some embodiments of the present technology, the individual penalty values in the plurality of individual penalty values 440 may be weighted for determining the combined penalty value 460. Weighing some of the individual penalty values during the determination of the combined penalty value 460 may reduce the amount of "false-positive" predictions made by the NN 400.

A "false-positive" prediction is when the NN 400 determines that a given segment, which occurs before the end of a given user utterance in a given digital audio signal, has a high probability of containing the end of the given user utterance. During in-use, reducing false-positive predictions may be beneficial, since a false-positive prediction may result in the IPA processing system 108 erroneously determining that the user utterance has ended during the most recently acquired portion of the digital audio signal 160 when, in fact, the user 102 has not yet stopped uttering.

For example, false-positive predictions may be more likely to occur for segments during which a pause of the user utterance occurs. In other words, a false-positive prediction is more likely to occur during segments when the user is pausing the user utterance (for example, during a pause between two uttered words by the user).

The number of false-positive predictions of the NN 400 may be reduced by weighing the individual penalty values associated with segments of the digital audio signal 202 that occur before the adjusted end-of-utterance moment in time so as to increase their contribution to the combined penalty value 460.

For example, in the given training iteration of FIG. 4, the first individual penalty value 442, the second individual penalty value 444, the third individual penalty value 446 and the fourth individual penalty value 448 may be multiplied by a false-positive reduction weight during the determination of the combined penalty value 460. This results in that the combined penalty value 460 is increased more for a given prediction error made by the NN 400 for any of the first segment 302, the second segment 304, the third segment 306 and the fourth segment 308, than for a same prediction error made by the NN 400 for any of the fifth segment 310 and the sixth segment 312.

As previously alluded to, the server 106 may use the adjusted end-of-utterance moment in time, instead of the end-of-utterance moment in time, for determining labels for the respective sets of features. The reason for using the adjusted end-of-utterance moment in time is that the developers of the present technology have realized that conditioning the NN 400 to generate a high output value for a segment during which the end-of-utterance moment in time occurs is a difficult task.

To better illustrate this, reference will now be made to both FIGS. 3 and 4. It should be recalled that the end-of-utterance moment in time occurs during the fourth segment 308 of the digital audio signal 202, while the adjusted end-of-utterance moment in time occurs during the fifth segment 310 of the digital audio signal 202. As seen in FIG. 3, a human is uttering during one portion of the fourth segment 308 and is not uttering during the other portion of the fourth segment 308. As for the fifth segment 310, the user has already ended uttering and, therefore, the user is not uttering during the fifth segment 310.

As a result, the NN 400 has, in a sense, more difficulty with (i) "learning" that the fourth set of features 328 is associated with a corresponding segment of the digital audio signal 202 during which the user utterance has ended than with (ii) "learning" that fifth set of features 330 is associated with a corresponding segment of the digital audio signal 202 during which the user utterance has ended. For example, this may be one of the reason why (i) the fourth output value 428 determined by the NN 400 for the fourth segment 308 is lower than (ii) the fifth output value 430 determined by the NN 400 for the fifth segment 310.

In some embodiments of the present technology, it is also contemplated that adding the pre-determined temporal offset 340 to the end-of-utterance moment in time, thereby determining the adjusted end-of-utterance moment in time, and using this adjusted end-of-utterance moment in time for labeling sets of features may help the NN 400 in reducing the number of false-positive predictions during the in-use phase thereof. It should be noted that conditioning the NN 400 via labels determined based on the adjusted end-of-utterance moment in time (as opposed to being determined based on the end-of-utterance moment in time) results in the NN 400 being more likely to (i) determine a given predicted in-use end-of-utterance moment in time that occurs a bit later in time than the actual in-use end-of-utterance moment in time than to (ii) determine a given predicted in-use end-of-utterance moment in time that occurs a bit earlier in time than the actual in-use end-of-utterance moment in time.

In summary, during the given training iteration of the NN 400, the server 106 is configured to input the plurality of sets of features 320 into the NN 400 in a same sequence as the sequence in which the corresponding segments of the digital audio signal 202 occur in the digital audio signal 202. The NN 400 is configured to generate a respective output value after the input of a respective set of features, and where a given output value is indicative of a probability of that the user utterance of the digital audio signal 202 has ended during the corresponding segment of the respective set of features. Once the respective output values are determined for the plurality of sets of features 320, the server 106 is configured to perform a comparison analysis between the respective output values and the respective labels of each one of the plurality of sets of features 320. The server 106 may perform the comparison analysis and thereby determine a plurality of individual penalty values for respective ones of the plurality of sets of features 320. A given individual penalty value is indicative of a prediction error made by the NN 400 for the corresponding segment of the respective set of features from the plurality of sets of features 320. The plurality of individual penalty values 440 may potentially be weighted and then combined for determining the combined penalty value 460 for the given training iteration of the NN 400. The server 106 may then use back-propagation techniques based on the combined penalty value 460 for adjusting the connections between the artificial "neurons" of the NN 400, thereby allowing the NN 400 in a sense to learn from the given training example having been provided thereto.

How the server 106 may use the IPA processing system 108, and more particularly, how the now-trained NN 400 of the IPA processing system 108 may be used during the in-use phase thereof, will now be described.

Figure 5:
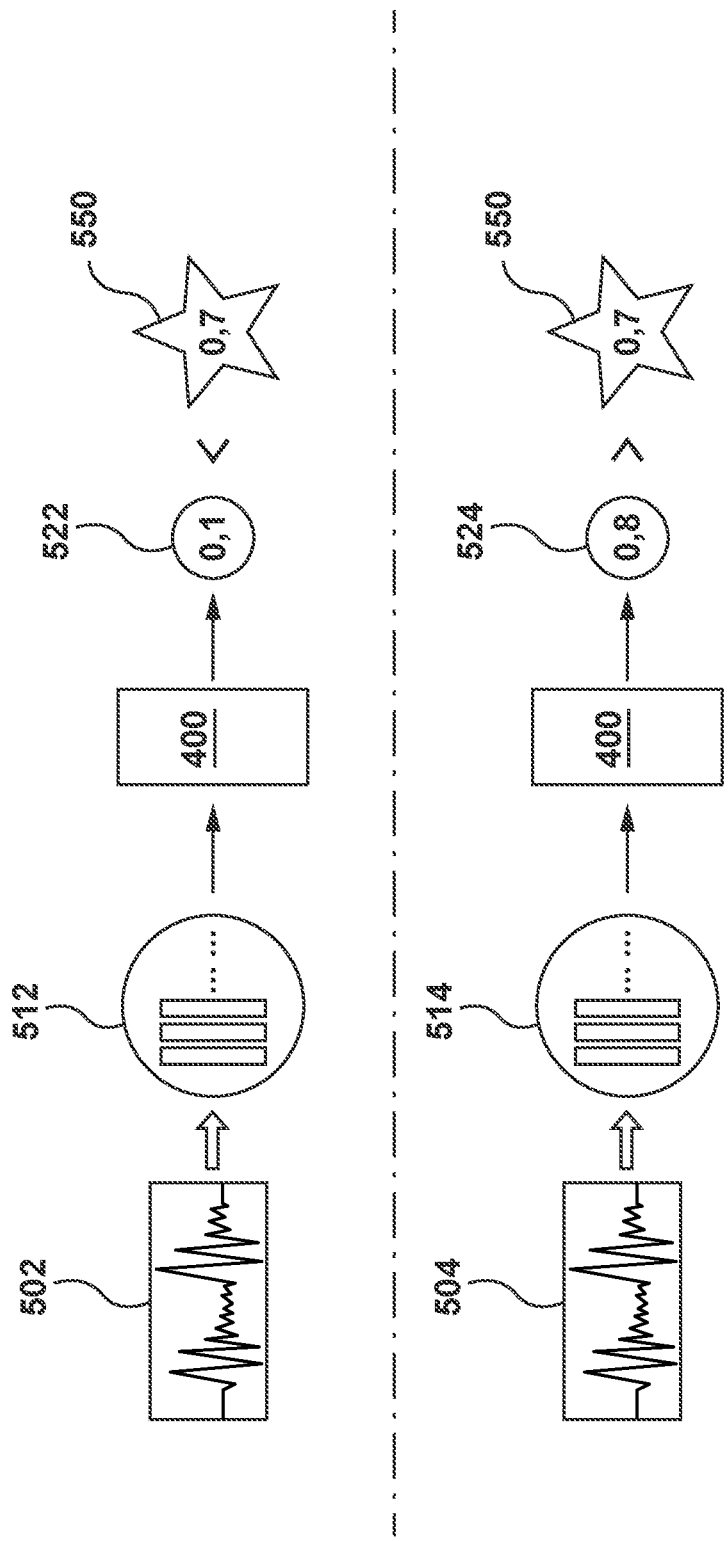
FIG. 5 depicts the in-use phase of the NN of FIG. 4 in non-limiting embodiments of the present technology.

As mentioned above, during the in-use phase, the server 106 may be acquiring (in real-time) data indicative of portions of the digital audio signal 160 (i.e., in-use digital audio signal). With reference to FIG. 5, let it be assumed that at a first given moment in time, the server 106 has two portions of 50 ms of the digital audio signal 160—in other words, by the first given moment in time, the server 106 has 100 ms of the digital audio signal 160.

It should be noted that, as mentioned above in one non-limiting example, portions of the digital audio signal 160 are recorded and transmitted to the IPA processing system 108 and may correspond to intervals of 50 ms. It should also be noted that, as mentioned above in another non-limiting example, the NN 400 has been trained based on segments of 100 ms. In such a case, the server 106 may be configured to use the NN 400 during the in-use phase thereof for each 100 ms of the digital audio signal 160.

In this case as mentioned above, at the first given moment in time, the server 106 has 100 ms (two sequential portions of 50 ms) of the digital audio signal 160. Therefore, the server 106 may have a first in-use segment 502 of 100 ms of the digital audio signal 160.

The server 106 may be configured to determine a first in-use set of features 512 for the first in-use segment 502 similarly to how the server 106 is configured to determine the plurality of sets of features 320 for the plurality of segments 300. It should be noted, however, that the server 106 may begin determining at least some of the first in-use set of features 512 before the first given moment in time. For example, once the first one of the two portions of the digital audio signal 160 is received, the server 106 may begin determining at least some of the first in-use set of features 512. Once the second one of the two portions of the digital audio signal 160 is received, the server 105 may begin determining other ones of the first in-use set of features 512.

Once the first in-use set of features 512 is determined, the server 106 may then input the first in-use set of features 512 into the NN 400. The NN 400 is configured to output a first in-use output value 522. Let it be assumed that the first in-use output value 522, as illustrated in FIG. 5, is "0.1" (or 10% for example). This means that the NN 400 may determine that there is a probability of "0.1" (or 10%) that the user utterance 150 of the user 102 has ended during the first in-use segment 502 of the digital audio signal 160.

The server 106 may be configured to compare the first in-use output value 522 to a pre-determined prediction threshold 550. The pre-determined prediction threshold 550 may be determined by an operator of the IPA processing system 108. Let it be assumed that, as illustrated in FIG. 5, that the pre-determined prediction threshold 500 is "0.7" (or 70% for example).

As such, the server 106 may determine that the first in-use output value 522 is inferior to the pre-determined prediction threshold 550. This means that the probability (determined by the NN 400) of that the user utterance 150 has ended during the first in-use segment 502 is too low for the IPA processing system 108 to determine that the user utterance 150 has ended during the first in-use segment 502. It can be said that, if the given in-use output value is inferior to the pre-determined prediction threshold 550, the IPA processing system 108 may determine that the user utterance 150 has not ended during the respective in-use segment.

While the IPA processing system 108 is processing the first in-use segment 502, the server 106 may be acquiring additional portions of the digital audio signal 160. As such, once the IPA processing system 108 determines that the user utterance 150 has not ended during the first in-use segment 502, the IPA processing system 108 may be configured to receive a next 100 ms of the digital audio signal 160 for repeating the above-mentioned in-use processing.

For example, the next 100 ms of the digital audio signal 160 may be available at a second given moment in time. The next 100 ms of the digital audio signal may be a second in-use segment 504 depicted in FIG. 5. The second in-use segment 504 may be a sequential segment to the first in-use segment 502 of the digital audio signal 160.

Hence, at the second given moment in time, the second in-use segment 504 may be used by the server 106 for determining a second in-use set of features 514. The second in-use set of features 514 may then be inputted into the NN 400. In this case, as explained above, the NN 400 may be configured to determine a second in-use output value 524 based on (i) the second in-use set of features 514 and (ii) the first in-use set of features 512 (a previously inputted in-use set of features). Let it be assumed that the second in-use output value 524 is "0.8" (or 80% for example).

As such, the server 106 may determine that the second in-use output value 524 is superior to the pre-determined prediction threshold 550. This means that the probability (determined by the NN 400) of that the user utterance 150 has ended during the second in-use segment 504 is high enough for the IPA processing system 108 to determine that the user utterance 150 has ended during the second in-use segment 504.

In response to determining that the user utterance 150 has needed during the second in-use segment 504 of the digital audio signal 160, the IPA processing system 108 may generate a trigger for the device 104 to stop recording the digital audio signal 160 since the user 102 stopped uttering.

In some embodiments, while the IPA processing system 108 is configured to determine whether the user utterance 150 of the user 102 has ended, the ASR algorithm may be employed by the IPA processing system 108 for determining an in-use textual representation of the user utterance 150. As such, once the IPA processing system 108 determines that the user utterance 150 has ended during the second in-use segment 504, the IPA processing system 108 may generate a trigger for the ASR algorithm to stop processing the in-use digital audio signal 160 after the second in-use segment 504.

Figure 6:
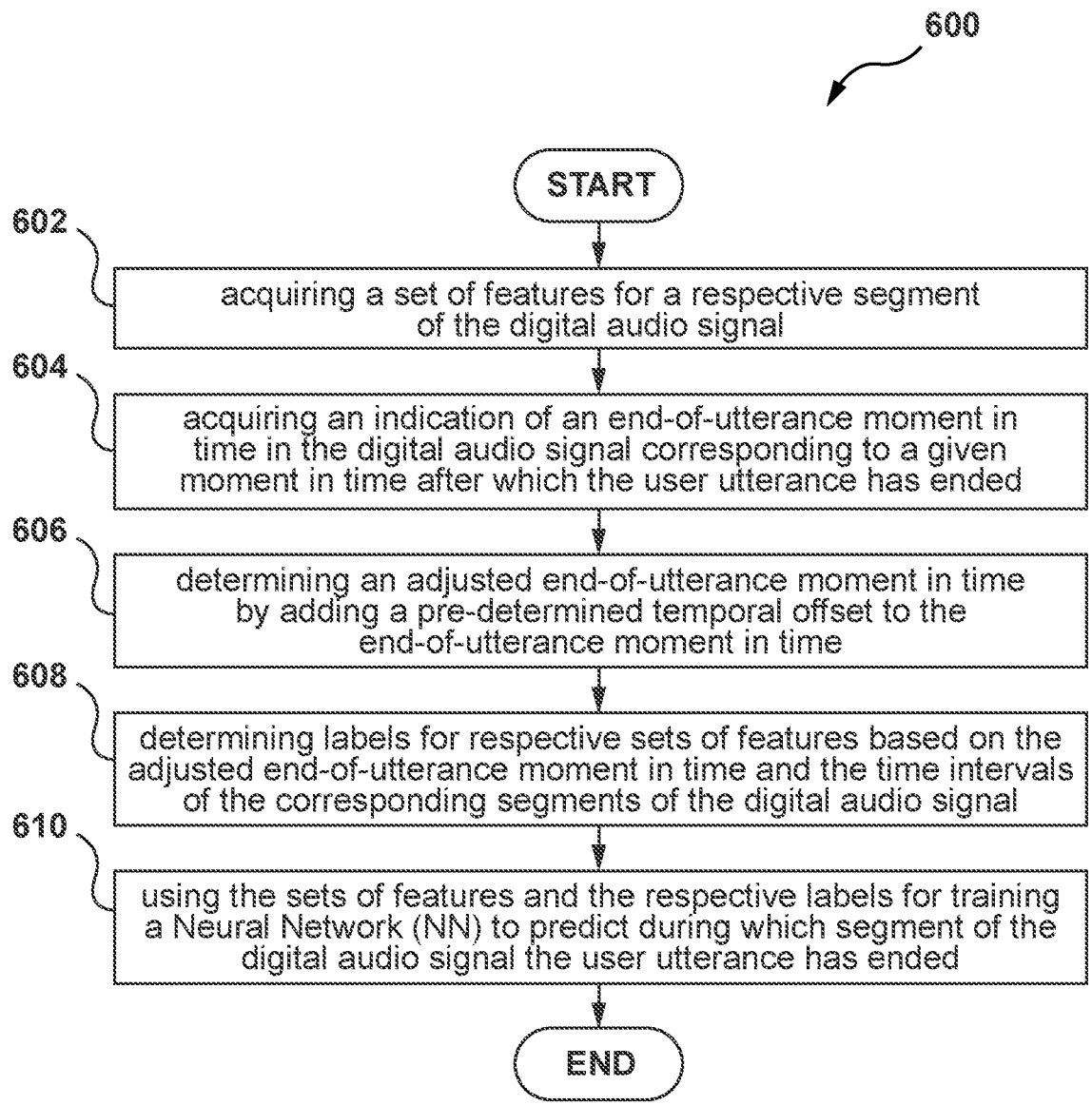
FIG. 6 is a schematic block diagram illustrating a flow chart of a method executed by an electronic device in accordance with non-limiting embodiments of the present technology.

In some embodiments of the present technology, the server 106 and/or the device 104 may be configured to execute a method 600, the schematic representation of which is depicted in FIG. 6, of identifying a user utterance from a digital audio signal. The method 600 will now be described.

Step 602: Acquiring a Set of Features for a Respective Segment of the Digital Audio Signal The method 600 begins at step 602 with an electronic device configured to acquiring a set of features for a respective segment of the digital audio signal. In some embodiments, the electronic device performing the step 602 may be the device 104. In other embodiments, the electronic device may be the server 106. It is contemplated that at least some steps of the method 600 may be executed by the device 104 while other steps of the method 600 may be executed by the server 106.

For example, the electronic device (such as, for example, the server 106 and/or the device 104) may acquire the plurality of sets of features 320 (see FIG. 3) for the respective ones from the plurality of segments 300 of the digital audio signal 202. It should be noted that, in some embodiments, the plurality of sets of features 320 may be determined and acquired from the device 104 and/or the server 106 and/or other computer entities (which may be configured to determine the plurality of sets of features 320 similarly to what has been described above) communicatively coupled to the server 106 and/or the device 104.

Each set of features from the plurality of sets of features 320 comprises at least acoustic-type features derivable from a respective one of the plurality of segments 300 of the digital audio signal 202. As explained above, in other embodiments of the present technology, sets of features may also include, in addition to acoustic-type features, linguistic-type features. It should be noted that the linguistic-type features may be determined based on the textual representation 222 associated with the digital audio signal 202.

It should be noted that the plurality of segments 300 of the digital audio signal 202 are of time intervals having a pre-determined time length. In the non-limiting example of FIG. 3, the plurality of segments 300 comprises segments of 100 ms each.

Step 604: Acquiring an Indication of an End-of-Utterance Moment in Time in the Digital Audio Signal Corresponding to a Given Moment in Time after which the User Utterance has Ended The method 600 continues to step 604 with the electronic device acquiring an indication of the end-of-utterance moment in time in the digital audio signal 202. The end-of-utterance moment in time corresponds to a given moment in time after which the user utterance in the digital audio signal 202 has ended.

For example, the electronic device (such as, for example, the server 106 and/or the device 104) may acquire the timestamp 242 that is indicative of a moment in time in the digital audio signal 202 after which the user utterance of the digital audio signal 202 has ended. It should be noted that the timestamp 242 may be acquired from the device 104 and/or the server 106 and/or other computer entities (which may be configured to provide the timestamp 242 similarly to what has been described above) communicatively coupled to the server 106 and/or the device 104.

In some embodiments, the indication of the end-of-utterance moment in time (e.g., timestamp 242) may be determined by a human-assessor, while in other embodiments, it may be determined by the device 104 and/or the server 106 and/or other computer entities employing and ASA algorithm, as explained above.

Step 606: Determining an Adjusted End-of-Utterance Moment in Time by Adding a Pre-Determined Temporal Offset to the End-of-Utterance Moment in Time The method 600 continues to step 606, with the electronic device configured to determine an adjusted end-of-utterance moment in time by adding a pre-determined temporal offset to the end-of-utterance moment in time. For example, the electronic device may be configured to determine the adjusted end-of-utterance moment in time by adding the pre-determined temporal offset 340 to the end-of-utterance moment in time as seen in FIG. 3.

The pre-determined temporal offset 340 may be determined by the operator of the NN 400. For example, the pre-determined temporal offset 340 may be 100 ms. It is contemplated that the determination of the length of the pre-determined temporal offset 340 by the operator may depend on inter alia different implementations of the present technology.

Step 608: Determining Labels for Respective Sets of Features Based on the Adjusted End-of-Utterance Moment in Time and the Time Intervals of the Corresponding Segments of the Digital Audio Signal The method 600 continues to step 608 with the electronic device configured to determine labels for the respective ones of the plurality of sets of features 320. The electronic device determines these labels based on (i) the adjusted end-of-utterance moment in time and (ii) the time intervals of the corresponding ones of the plurality of segments 300.

It should be noted that a given label is indicative of whether the user utterance has ended during the corresponding segment of the digital audio signal 202 associated with the respective one of the plurality of sets of features 320.

Put another way, the electronic device may determine the labels as follows:

if the time interval associated with a given one of the plurality of segments 300 occurs before the adjusted end-of-utterance moment in time, the electronic device determines a label for the corresponding one of the plurality of sets of features 320 that is indicative of that the user utterance has not ended during the given one of the plurality of segments 300; and if (i) the time interval associated with the given one of the plurality of segments 300 includes the adjusted end-of-utterance moment in time, or (ii) the time interval associated with the given one of the plurality of segments 300 occurs after the adjusted end-of-utterance moment in time, the electronic device determines a label for the corresponding one of the plurality of sets of features 320 that is indicative of that the user utterance has ended during the given one of the plurality of segments 300.

Step 610: Using the Sets of Features and the Respective Labels for Training a Neural Network (NN) to Predict During which Segment of the Digital Audio Signal the User Utterance has Ended The method 600 continues to step 610 with the electronic device configured to use the plurality of sets of features 320 and the respective labels for training the NN 400. In one-non limiting example, the step 610 may correspond to the electronic device performing a given training iteration of the training phase of the NN 400.

The NN 400 is trained to predict during which segment of the plurality of segments 300 of the digital audio signal 202 the user utterance has ended.

In some embodiments, the step 610 may comprise the electronic device configured to organize the plurality of sets of features and the respective labels in a same order as the order in which the corresponding segments of the plurality of segments 300 occur in the digital audio signal 202. This may be the case, for example, when the NN 400 has a network topology that enables the NN 400 to have "memories" of events that happened earlier. As such, the plurality of sets of features 320 may be inputted into the NN 400 in a same sequence as the sequence in which the plurality of segments 300 occur in the digital audio signal 202.

In some embodiments of the present technology, the electronic device may be configured to performing additional steps to those illustrated in FIG. 6. For example, the electronic device may be configured to perform at least some steps during the in-us phase of the NN 400.

In some embodiments, the electronic device may be configured to acquire at least some of an in-use digital audio signal. For example, the electronic device (such as, for example, the device 104 or the server 106) may be configured to acquire at least some of the digital audio signal 160. The acquisition of the at least some of the digital audio signal 160 may occur in real-time. For example, the digital audio signal 160 may be being recorded in real-time during the user utterance 150. As a result, portions of the digital audio signal 160 may be acquired by the electronic device in real-time as they are being recorded.

The electronic device may also be configured to determine a first in-use set of features 512 for the first in-use segment 502. It should be noted that the first in-use segment 502 may include a most recently acquired portion of the in-use digital audio signal 160. For example, the first in-use set of features 512 may be determined for the first in-use segment 502 that may be a most latest 100 ms of the digital audio signal 160 that has been acquired by the electronic device.

The first in-use set of features 512 may comprise acoustic-type features derivable from the first in-use segment 502. In other words, similarly to what has been described above, the electronic device may be configured to derive acoustic-type features from the first in-use segment 502. In other embodiments of the present technology, the first in-use set of features 512 may also include linguistic-type features, as explained above, without departing from the scope of the present technology. As such, in other embodiments, similarly to what has been described above, the electronic device may employ an algorithms (such as ASR and ASA algorithms) for determining linguistic-type features associated with the first in-use segment 502.

It is also contemplated that the electronic device may be configured to use the NN 400 to determine, based on the first in-use set of features 512, the first in-use output value 522 indicative of a probability of the user utterance 150 (in-use user utterance) of the digital audio signal 160 having ended during the first in-use segment 502.

The electronic device may compare the first in-use output value 522 to pre-determined prediction threshold 550. In response to determining that the first in-use output value 522 is above the pre-determined prediction threshold 550, the electronic device may determine that the user utterance 150 ended during the first in-use segment 502 of the digital audio signal 160.

In some embodiments, if the electronic device determines that the user utterance 150 ended during the first in-use segment 502 of the digital audio signal 160, the electronic device may be configured to generate a trigger for stopping recording the digital audio signal 160.

In other embodiments, the electronic device may be providing at least some of the digital audio signal 160 to the ASR algorithm for determining the textual representation of the user utterance 150. It is contemplated that, in response to determining that the user utterance 150 ended during the first in-use segment 502 of the digital audio signal 160, the electronic device may generate a trigger for stopping providing the ASR with the digital audio signal 160.

It should also be noted that, in response to determining that the first in-use output value 522 is below the pre-determined prediction threshold 550, the electronic device may be configured to determine the second in-use set of features 514 for the second in-use segment 504. For example, the second in-use segment 504 may be a sequential segment to the first in-use segment 502 in the at least some of the digital audio signal 160 acquired by the electronic device. The second in-use set of features 514 may be determined similarly to how the first in-use set of features 512 may be determined.

The electronic device may also use the NN 400 to determine, based on the first in-use set of features 512 and the second in-use set of features 514, the second in-use output value 524 indicative of the probability the user utterance 150 ending during the second in-use segment 504 of the digital audio signal 160.

It is contemplated that the NN 400 may have a network topology that enables the NN 400 to have "memories" of events that happened earlier and, therefore, when the electronic device inputs the second in-use set of features 514, the NN 400 has "memories" of the first in-use set of features 512 having been previously inputted into the NN 400.

The electronic device may compare the second in-use output value 524 to the pre-determined prediction threshold 550, and in response to determining that the second output value 524 is above the pre-determined prediction threshold 550, the electronic device may determine that the user utterance 150 ended during the second in-use segment 504 of the digital audio signal 160. In response thereto, the electronic device may generate triggers similarly to what has been described above.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of identifying a user utterance from a digital audio signal, the digital audio signal containing an audio recording of the user utterance, the method executable by an electronic device, the method comprising:
   acquiring, by the electronic device, a set of features for a respective segment of the digital audio signal, each set of features comprising at least acoustic-type features derivable from a respective segment of the digital audio signal, the segments of the digital audio signal being associated with respective time intervals of a pre-determined time length;
   acquiring, by the electronic device, an indication of an end-of-utterance moment in time in the digital audio signal corresponding to a given moment in time after which the user utterance has ended;
   determining, by the electronic device, an adjusted end-of-utterance moment in time by adding a pre-determined temporal offset to the end-of-utterance moment in time;
   determining, by the electronic device, labels for respective sets of features based on the adjusted end-of-utterance moment in time and the time intervals of the corresponding segments of the digital audio signal, a given label being indicative of whether the user utterance has ended during the corresponding segment of the digital audio signal associated with the respective set of features;
   using, by the electronic device, the sets of features and the respective labels for training a Neural Network (NN) to predict during which segment of the digital audio signal the user utterance has ended, the training comprising, for a given training iteration of the NN:
      generating a plurality of individual penalty values, a given individual penalty value being associated with a respective segment of the digital audio signal, the digital audio signal including segments that precede the end-of-utterance moment in time, the given individual penalty value being indicative of a prediction error made by the NN for the respective segment of the digital audio signal;
      generating a combined penalty value for the given training iteration of the NN, the combined penalty value being a combination of the plurality of individual penalty values;
      using the combined penalty value to train the NN,
   wherein the method further comprises, during an in-use phase of the NN:
      acquiring, by the electronic device, at least some of an in-use digital audio signal;
      determining, by the electronic device, a first set of features for a first segment of the in-use digital audio signal, the first segment including a most recently acquired portion of the in-use digital audio signal, the in-use digital audio signal being recorded in real-time during an in-use utterance, the first set of features comprising at least acoustic-type features derivable from the first segment of the digital audio signal;
      using, by the electronic device, the NN to determine based on the first set of features a first value indicative of a probability of the in-use user utterance having ended during the first segment of the in-use digital audio signal;
      responsive to the first value being above a pre-determined threshold, determining, by the electronic device that the in-use user utterance ended during the first segment of the in-use digital audio signal,
   wherein the method further comprises, responsive to the first value being below the pre-determined threshold:
      determining, by the electronic device, a second set of features for a second segment of the in-use digital audio signal, the second segment being sequential to the first segment in the in-use digital audio signal, the second set of features comprising at least acoustic-type features derivable from the second segment of the digital audio signal;
      using, by the electronic device, the NN to determine based on the first set of features and the second set of features a second value indicative of a probability of the in-use user utterance having ended during the second segment of the in-use digital audio signal; and
      responsive to the second value being above the pre-determined threshold, determining, by the electronic device, that the in-use user utterance ended during the second segment of the in-use digital audio signal.

2. The method of claim 1, wherein a given set of features further comprises linguistic-type features for a respective segment of the digital audio signal.

3. The method of claim 1, wherein the linguistic-type features are determined based on a textual representation of the user utterance, the textual representation comprising at least one word and at least one pause.

4. The method of claim 1, wherein the indication of the end-of-utterance moment in time is determined by at least one of a human-assessor and an Automatic Speech-to-text Alignment (ASA) algorithm.

5. The method of claim 1, wherein the using the sets of features and the respective labels for training the NN comprises:
   organizing the sets of features and the respective labels in a same order as the order in which the corresponding segments occur in the digital audio signal.

6. The method of claim 1, wherein the method further comprises:
   generating, by the electronic device, a trigger for stopping recording the in-use digital audio signal.

7. The method of claim 1, wherein the method further comprises:
   providing, by the electronic device, an Automatic Speech Recognition (ASR) algorithm with at least some of the in-use digital audio signal for determining a textual representation of the in-use utterance; and
   generating, by the electronic device, a trigger for stopping providing the ASR algorithm with the in-use digital audio signal.

8. The method of claim 1, wherein the electronic device comprises one of:
   a user electronic device; and
   a server coupled to the user electronic device by a communication network.

9. An electronic device for identifying a user utterance from a digital audio signal, the digital audio signal containing an audio recording of the user utterance, the electronic device being configured to:

acquire a set of features for a respective segment of the digital audio signal, each set of features comprising at least acoustic-type features derivable from a respective segment of the digital audio signal, the segments of the digital audio signal being associated with respective time intervals of a pre-determined time length;

acquire an indication of an end-of-utterance moment in time in the digital audio signal corresponding to a given moment in time after which the user utterance has ended;

determine an adjusted end-of-utterance moment in time by adding a pre-determined temporal offset to the end-of-utterance moment in time;

determine labels for respective sets of features based on the adjusted end-of-utterance moment in time and the time intervals of the corresponding segments of the digital audio signal, a given label being indicative of whether the user utterance has ended during the corresponding segment of the digital audio signal associated with the respective set of features;

use the sets of features and the respective labels for training a Neural Network (NN) to predict during which segment of the digital audio signal the user utterance has ended, for a given training iteration of the NN, the electronic device being configured to:
  generate a plurality of individual penalty values, a given individual penalty value being associated with a respective segment of the digital audio signal, the digital audio signal including segments that precede the end-of-utterance moment in time, the given individual penalty value being indicative of a prediction error made by the NN for the respective segment of the digital audio signal;
  generate a combined penalty value for the given training iteration of the NN, the combined penalty value being a combination of the plurality of individual penalty values;
  use the combined penalty value to train the NN, wherein the electronic device is further configured to, during an in-use phase of the NN:
  acquire, by the electronic device, at least some of an in-use digital audio signal;
  determine, by the electronic device, a first set of features for a first segment of the in-use digital audio signal, the first segment including a most recently acquired portion of the in-use digital audio signal, the in-use digital audio signal being recorded in real-time during an in-use utterance, the first set of features comprising at least acoustic-type features derivable from the first segment of the digital audio signal;
  use, by the electronic device, the NN to determine based on the first set of features a first value indicative of a probability of the in-use user utterance having ended during the first segment of the in-use digital audio signal;
  responsive to the first value being above a pre-determined threshold, determine, by the electronic device, that the in-use user utterance ended during the first segment of the in-use digital audio signal, wherein the electronic device is further configured to, responsive to the first value being below the pre-determined threshold:
  determine a second set of features for a second segment of the in-use digital audio signal, the second segment being sequential to the first segment in the in-use digital audio signal, the second set of features comprising at least acoustic-type features derivable from the second segment of the digital audio signal;
  use, by the electronic device, the NN to determine based on the first set of features and the second set of features a second value indicative of a probability of the in-use user utterance having ended during the second segment of the in-use digital audio signal; and
  responsive to the second value being above the pre-determined threshold, determine, by the electronic device, that the in-use user utterance ended during the second segment of the in-use digital audio signal.

10. The electronic device of claim 9, wherein a given set of features further comprises linguistic-type features for a respective segment of the digital audio signal.

11. The electronic device of claim 9, wherein the linguistic-type features are determined based on a textual representation of the user utterance, the textual representation comprising at least one word and at least one pause.

12. The electronic device of claim 9, wherein the indication of the end-of-utterance moment in time is determined by at least one of a human-assessor and an Automatic Speech-to-text Alignment (ASA) algorithm.

13. The electronic device of claim 9, wherein the electronic device configured to use the sets of features and the respective labels for training the NN comprises the electronic device being configured to:
  organize the sets of features and the respective labels in a same order as the order in which the corresponding segments occur in the digital audio signal.

14. The electronic device of claim 9, wherein the electronic device is further configured to:
  generate a trigger for stopping recording the in-use digital audio signal.

15. The electronic device of claim 9, wherein the electronic device is further configured to:
  provide an Automatic Speech Recognition (ASR) algorithm with at least some of the in-use digital audio signal for determining a textual representation of the in-use utterance; and
  generate a trigger for stopping providing the ASR algorithm with the in-use digital audio signal.

16. The electronic device of claim 9, wherein the electronic device comprises one of:
  a user electronic device; and
  a server coupled to the user electronic device by a communication network.

17. The method of claim 1, wherein the generating the combined penalty value for the given training iteration of the NN comprises:
  weighing individual penalty values associated with the segments that precede the end-of-utterance moment in time in the combination of the plurality of individual penalty values so as to increase their contribution to the combined penalty value.

18. The electronic device of claim 9, wherein to generate the combined penalty value for the given training iteration of the NN comprises the electronic device configured to:
  weigh individual penalty values associated with the segments that precede the end-of-utterance moment in time in the combination of the plurality of individual penalty values so as to increase their contribution to the combined penalty value.

19. A method of training a Neural Network (NN) for identifying a user utterance from a digital audio signal, the digital audio signal containing an audio recording of the user utterance, the method executable by an electronic device, the method comprising:

acquiring, by the electronic device, a set of features for a respective segment of the digital audio signal,
a given set of features comprising at least acoustic-type features derivable from a respective segment of the digital audio signal,
the segments of the digital audio signal being associated with respective time intervals;

determining, by the electronic device, an adjusted end-of-utterance moment in time by adding a pre-determined temporal offset to an end-of-utterance moment in time in the digital audio signal,
the end-of-utterance moment in time corresponding to a given moment in time after which the user utterance has ended;

determining, by the electronic device, labels for respective sets of features based on the adjusted end-of-utterance moment in time and the time intervals of the corresponding segments of the digital audio signal,
a given label being indicative of whether the user utterance has ended during the corresponding segment of the digital audio signal associated with the respective set of features;

training, by the electronic device, the NN using the sets of features and the respective labels to predict during which segment of the digital audio signal the user utterance has ended, the training including, for a given training iteration of the NN:
generating a plurality of individual penalty values, a given individual penalty value being associated with a respective segment of the digital audio signal, the digital audio signal including segments that precede the end-of-utterance moment in time, the given individual penalty value being indicative of a prediction error made by the NN for the respective segment of the digital audio signal;
generating a combined penalty value for the given training iteration of the NN, the combined penalty value being a combination of the plurality of individual penalty values;
using the combined penalty value to train the NN during the given training iteration.

20. The method of claim 19, wherein the generating the combined penalty value for the given training iteration of the NN comprises:
weighing individual penalty values associated with the segments that precede the end-of-utterance moment in time in the combination of the plurality of individual penalty values so as to increase their contribution to the combined penalty value.

* * * * *